United States Patent
Kearney et al.

(10) Patent No.: US 6,907,321 B2
(45) Date of Patent: Jun. 14, 2005

(54) FAULT CONTROL AND RESTORATION IN A MULTI-FEED POWER NETWORK

(75) Inventors: Adrian Kearney, Dublin (IE); Enda Mimnagh, Westmeath (IE)

(73) Assignee: Viserge Limited, Dublin (IE)

( * ) Notice: Subject to any disclaimer, the term of this patent is extended or adjusted under 35 U.S.C. 154(b) by 0 days.

(21) Appl. No.: 10/355,139

(22) Filed: Jan. 31, 2003

(65) Prior Publication Data

US 2004/0153215 A1 Aug. 5, 2004

(51) Int. Cl.[7] .................................................. H02H 7/26
(52) U.S. Cl. ...................... 700/292; 700/293; 700/295; 702/58; 702/59
(58) Field of Search ................................ 700/292, 293, 700/295, 296; 702/58, 59

(56) References Cited

U.S. PATENT DOCUMENTS

| | | | |
|---|---|---|---|
| 5,237,511 A | 8/1993 | Caird et al. | 364/483 |
| 5,574,611 A * | 11/1996 | Nishijima et al. | 361/64 |
| 5,701,226 A | 12/1997 | Gelbien et al. | 361/63 |
| 6,275,366 B1 * | 8/2001 | Gelbien et al. | 361/62 |
| 6,341,054 B1 * | 1/2002 | Walder et al. | 361/66 |
| 2002/0080539 A1 | 6/2002 | McClure et al. | 361/59 |
| 2002/0133304 A1 * | 9/2002 | McClure et al. | 702/58 |
| 2004/0010350 A1 * | 1/2004 | Lof et al. | 700/292 |

FOREIGN PATENT DOCUMENTS

EP    1164678    12/2001

* cited by examiner

Primary Examiner—Leo Picard
Assistant Examiner—Michael D. Masinick
(74) Attorney, Agent, or Firm—Jacobson Holman PLLC

(57) ABSTRACT

The present invention relates to a control system for automatically reconnecting power to customers in a distribution automation multi-feed power network on a fault disconnecting customers in the network. This invention provides the simple switching architecture with local control means that are implemented in the event of a fault. Each switch in the system has an intelligent switch controller which results in a faster restoration time which reduces customer down time in the event of a fault in the network. The system operates without the need for complex communication systems or central controllers. Each intelligent switch controller has the ability to cause its respective switch to open or close in the event of a fault. The network may be restored in a sequential manner subsequent to the detection of a fault in the network thereby allowing for the simple detection of the location of a fault.

62 Claims, 10 Drawing Sheets

FAULT CONTROL AND RESTORATION IN A MULTI-FEED POWER NETWORK

BACKGROUND OF THE INVENTION

1. Field of the Invention

The present invention relates to a control system for automatically reconnecting power to customers in a distribution automation multi-feed power network on detection of a fault disconnecting customers in the power network.

2. Description of the Related Art

Most customers in an electrical power network are connected to the power source via a low-medium voltage distribution network. The distribution network consists of a web of distribution feeders that are fed from one or more power source via distribution substations. Each distribution feeder supplies power from at least one power source to one or more customers is connected to each distribution feeder. Each of these feeders are fed through further customer feeders via isolation switches which will normally have a number of switches which can be opened to isolate faults should a fault occur. Due to the large quantities of customers and their wide distribution from remote rural areas to densely populated urban areas, the distribution network is extensive and very dispersed. Some of the power network is fed over ground and some is fed underground.

Because the network is so extensive, it is frequently the subject of system generated faults or externally generated faults. System generated faults are caused by equipment failures due to problems with the actual equipment in the network. These faults are inherent in the network itself being caused due to malfunction of equipment or other failures of equipment or due to operating failures caused by the operators or the customers in the network. Externally generated faults are caused by environmental conditions the network for example, storms may knock trees onto power lines, lightening may strike power lines. Construction machinery may dig up or knock down power lines. Whatever the reason, the distribution network is prone to frequent faults.

A fault on a distribution feeder will generally lead to loss of supply for some or all of the customers connected to that distribution feeder. Once this happens, the main objective is to minimise the number of customers disconnected by the fault and isolate the fault.

Generally, there is a protection device or Autorecloser switch at the distribution substation that will trip under fault condition to disconnect the feeder and isolate the fault. This disconnects all the consumers connected to the feeder. In order to reduce the number of customers disconnected, there are generally more isolating devices along the feeder that can be opened to isolate the fault closer to the fault point. This minimises the number of customers disconnected.

This still leaves all the circuit, downstream of the fault switch, without power. To improve this situation, circuits can frequently be supplied from more than one source, generally known as dual feed or multi-feed power sources. Where multiple sources can supply a network, the sources must not be connected together via the circuits at any time. To avoid this, there is always an Open-point in the circuit, namely, a switch deliberately left in the open state to keep the sources disconnected to remove the danger of a short circuit. Taking the simplest example in a single power source supply the basic known schemes to restore power from a single power source supply include:

a) Using manual operation of the switches and breakers to isolate the fault and restore power to the maximum number of consumers. This operation of the switches and breakers can be done locally at the devices or remotely via some communications media. This is a slow and time consuming process as the operator must physically travel to each switch to operate it.

b) Using an Autorecloser in conjunction with the main substation circuit breaker to try to reclose the breaker and re-establish power following a fault. This is effective for instantaneous faults but does not help for permanent faults.

c) Using several Autoreclosers along the distribution line with each Autorecloser being configured with different re-closing times. By selecting the correct timings, the device closest to the fault will lock-open first and isolate the fault while the other devices can safely reclose with the fault isolated. These can only be programmed to isolate the fault from one supply and cannot be used to restore power from an alternative supply.

There are various schemes used at present to isolate distribution faults and minimise the number of consumers disconnected in a multi-feed power network. Most of these schemes, however, concentrate on isolating the fault and restoring power from the original supply. Very few schemes focus on automatically reconnecting to another supply via the Open-point. The basic schemes to restore power from an alternative supply in a multi-feed system include:

d) Manual operation of the switches and breakers to isolate the fault section and close an Open-point to restore power from an alternative supply. This is a slow and time consuming process as the operator must physically travel to each switch to operate it.

e) Remote manual operation of the switches and breakers to isolate the fault section and close an Open-point to restore power from an alternative supply. This remote operation requires a communication system that allows data to be transferred between each device and the controlling station. It requires information from each device to be available to a control manager or a control operator and commands from the controlling stations to operate the appropriate device.

f) Remote automatic operation of the switches and breakers to isolate the fault section and close an Open-point to restore power from an alternative supply. This is similar to the previous scheme but instead of an operator controlling the devices remotely, the system will automatically analyse the information and try to restore power without manual intervention.

Some schemes rely on remote operation of the Open-point and isolating switches from some central controlling station. This requires a communications means to each device and a comprehensive master controller that maintains information from all devices and allows either manual operator control or automatic decision making on how best to restore power. These are very costly capital investments, have substantial running costs and technical problems associated with them.

U.S. Pat. No. 5,701,226 discloses an apparatus and method for distributing electrical power from power substation circuits. The apparatus disclosed by this U.S. patent includes at least one fault isolating switch positioned in series with the feeder conductors of each substation circuit so as to define a line side and a load side. A current sensor connected to the isolation switch is provided to measure the current on the load side of the isolating switch. Each isolating switch is connected to a switch controller which controls the movement of the isolating switch, the switch controller determines if the measured current from the current sensor exceeds a predetermined value and selectively activates the isolating switch when the predetermined value is exceeded. The switch controller further has a distribution station controller located remotely from the isolating switch for sending and receiving data. The data transferred to the switch controller from the distribution station controller includes instructions for actuating the isolating switch. The fault condition is only determined by measuring the current at each switch. While this U.S. patent adequately proposes a solution to solve the problem of isolating faults within a power distribution system, the switching technology employed is quite cumbersome and expensive. Therefore, a problem arises for multi feed systems, when this U.S. patent isolates the fault, all the customers between the isolated fault and the open point which is necessary to incorporate dual feed systems, are disconnected. Further control and complex communications are necessary to move the open point which has resulted in that heretofore no effective solution has been proposed by any utility company to effectively solve the above-mentioned problems. The apparatus relies on a centralised distribution controller and a substation controller. The open-point or switch is only moved by the centralised distribution controller opening the isolation switch and determining what other power source can supply power. This implementation requires complex software and expensive distribution controller with communications to each switch.

SUMMARY OF THE INVENTION

An object of the present invention is to provide a control system for automatically reconnecting power to customers in a distribution automation multi-feed power network. This is achieved by providing intelligent switch controllers that monitor the voltage of both sides of each switch in a network and makes local intelligent decisions about the state of the network and how power can be restored automatically to as many customers as possible in the event of a fault in the power network.

A further object of the present invention is that for a multi-feed power network, the maximum number of customers in the network have power reconnected from one of the supplies automatically, using local control. The invention relies on local automation as each switch has an associated intelligent switch controller and is not dependent on any communications between two separate locations. The present invention obviates the need for complex communication systems or centralised controllers which require knowledge of all the switches in the network which is expensive and technically difficult to implement.

Another object of the present invention is to achieve faster restoration time in a power network which reduces customer down time and thereby increases customer satisfaction, while reducing the maintenance requirements of networks and increasing power utility revenue.

Another object of the present invention is to provide a control system for power networks using reduced cost switches. In a preferred embodiment this switch is operated under no load conditions when opening the switch is opened.

Another object of the invention is to provide minimal communications equipment for certain applications. This reduces the installation costs of control systems as there is no infrastructure required or remote testing. This leads to improved reliability in the power network as communications are one of the most unreliable aspects of power control systems.

A further object of the present invention is that no current sensor is required to determine the fault. This reduces the cost and configurations and reduces the hardware complexity.

Another object of the present invention is to determine the fault location in a power network. The ability to determine the fault from the timing of the fault restoration sequences allows the fault to be located quickly which expedites the restoration process and reduces power utility costs.

Another object of the present invention is to eliminate the need for a centralised master station. This results that there is no requirement to provide a control room or expensive central control equipment.

Another object of the present invention is when moving the open point to the isolated fault there is provided a self-regulating load on the switches.

A further object to the present invention is to introduce local communications for making decisions about a switch adjacent to the isolated fault when the fault is identified.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE INVENTION

Figure 1:
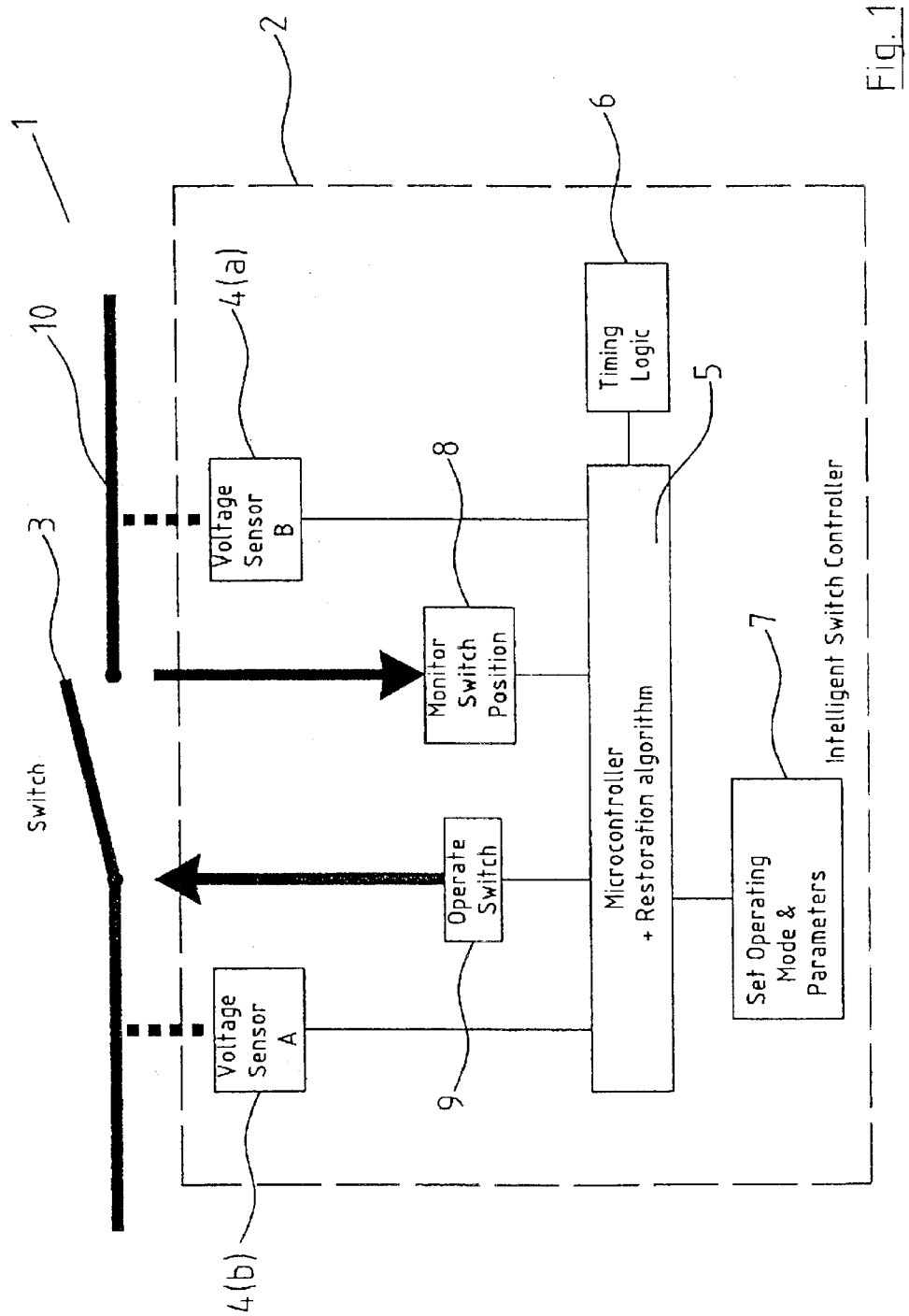
FIG. 1 is a functional block diagram of an intelligent switch controller.
Figure 2:
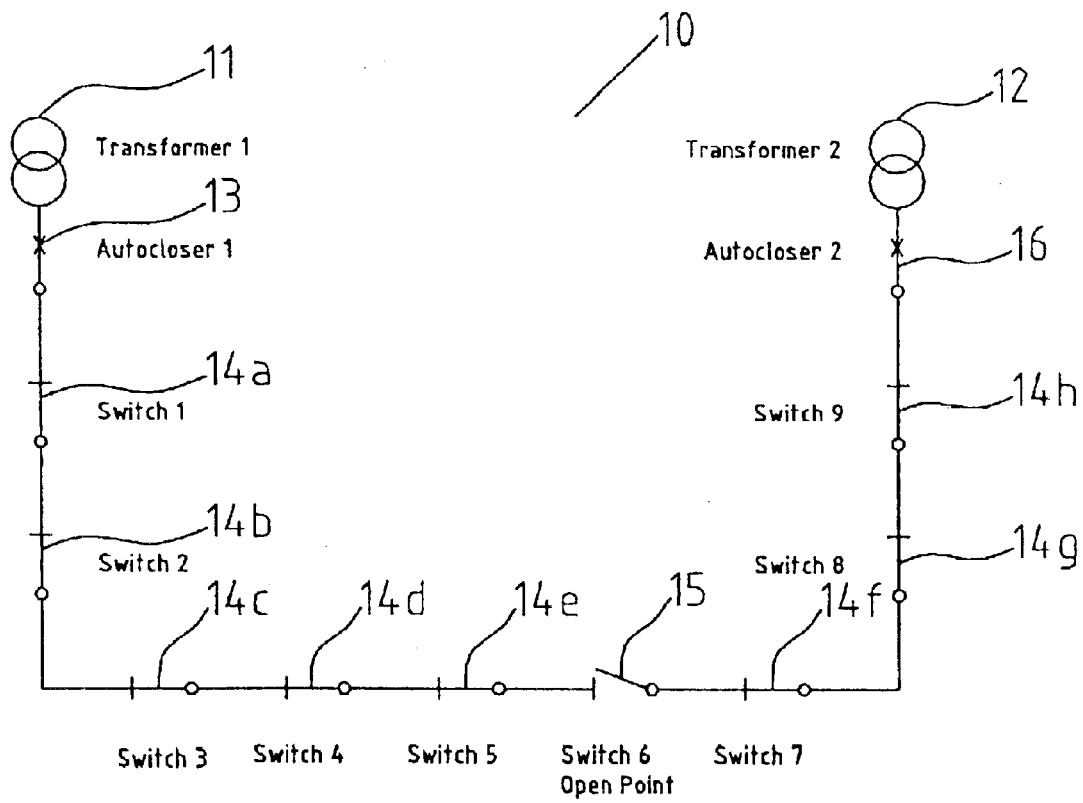
FIGS. 2 to 14 illustrate a switching sequence in a power network.

Referring now initially to FIG. 1, there is illustrated a functional block diagram of portion of a distribution network, indicated generally by the reference numeral 1. An intelligent switch controller is identified by that portion surrounded by the interrupted lines and identified by the reference numeral 2 and a fault isolation switch which can act as an open or closed switch is identified by the reference numeral 3. The fault isolation switch 3 which forms part of a power distribution network is connected to a power line 10, (partially shown). The intelligent switch controller 2 comprises voltage sensors 4a and 4b which measure voltage at either side of the switch 3. The intelligent switch controller 2 has a microcontroller 5 which is connected to a timing logic circuit 6 and an operating circuit 7. A monitoring circuit 8 and an actuating circuit 9, are connected to the microcontroller 5.

In operation, the voltage sensors 4a and 4b at both sides of the switch 3, in combination with the actual position of the switch 3 enable the microcontroller 5 to determine the state of the power distribution network at the switch 3. This information is used by the microcontroller 5 as part of a restoration sequence to decide whether to open or close the switch 3. The voltage sensors 4a and 4b are required at both sides of the switch 3 for a multi-feed power system to determine when power is lost or restored at either side of an open switch which are necessary in a multi-feed power system. This is important for evaluating the various conditions in a restoration sequence. For example, an open switch 3 on the power distribution network should have voltage present at both sides of the switch under normal circumstances. When a fault occurs at one side of the open switch, then voltage will be lost at one of the sensors 4a or 4b. Based on this reading, along with the configured timings and current mode of operation, a controller algorithm stored by the microcontroller 5 can decide whether to close the switch 3 and restore power to the other side of the power network. This can only be determined by using voltage sensors 4a and 4b at both sides of the switch, the operation of which is as detailed below.

An open switch is simply a fault isolation switch in an open state. In essence by having one open switch the network is divided into two subnetworks each being powered by a separate power source. Power can be supplied to the power sources from a mains supply (not shown). By increasing the number of open switches and power sources increases the number of sub-networks in the network and hence the number of power sources increases in order to supply power to all the customers in the network.

The timing logic circuit 6 is necessary to determine the timing between various conditions occurring and subsequent steps in the restoration sequence. The timing of events in the restoration sequence is critical in determining the fault isolation. It is important that no switching actions are performed immediately after the initial power loss as an auto-recloser switch is expected to immediately close and try to restore power for a transitory fault. Only after this timing period, is the fault considered to be sustained and the microcontroller 5 commences the restoration sequence. The length of time for the restoration sequence for each power source is the aggregate switching time delay at each switch connected to the power source. Similarly, if the microcontroller 5 closes a switch and onto a fault and power is immediately lost, the intelligent controller 2 can determine from the timings that it was responsible for a trip in the network. Therefore, the timing logic is a very important component in the overall operation of the microcontroller 5.

The operating circuit 7 sets the current operating mode of the intelligent controller 2 to allow for normal switch operation, switch maintenance, network changes and reset after a fault has been rectified. The operating circuit 7 will be set differently for a normally closed switch and a normally open switch to allow the restoration algorithm to operate properly. It may be required to disable the restoration algorithm at various switches for maintenance purposes or other operational requirements. When switches enter "lockout" mode following a fault, they may need to be reset after the fault clearance. These various modes, together with the various timing parameters, must be set through some interface for the restoration algorithm.

Once the intelligent controller 2 decides to operate the switch 3, there must be some mechanism to actually interface with the switch 3 to perform the switching. This will depend entirely on the specific switch and its defined interface. At one level, this could be operated by the presence or absence of voltage at a switch location. At another extreme, it may necessitate motors and mechanical drives to operate the switch 3. Whatever the operating mechanism, the intelligent controller 2 must include the logic interface to enable the external operation of the switch 3. The controller 2 also monitors the state of the switch to determine whether the switch is actually open or closed.

As already mentioned, the invention is particularly concerned with solving a problem associated with dual feed or multi-feed power sources. The operation of the invention will be described with reference to FIGS. 2 to 15. For the purposes of illustrating the invention, a dual feed source power network will be described in which the power network 10 is again represented by the reference numeral 10. Two separate power sources 11 and 12, each with an associated auto-recloser switch 13 and 16 respectively, supply power to the network 10. On the network 10, there is a plurality of fault isolation switches 14a to 14h, positioned in series between the power sources 11 and 12. There is provided a separate intelligent switch controller 2 (not shown) with each fault isolation switch 14a to 14h. Because the two power sources 11 and 12 are on the same power network 10, it is necessary to have an open switch 15 to prevent a short circuit in the network 10. The autorecloser switches 13 and 16 will each have an associated switch controller 2. Dealing firstly with each switch the way each switch operates is as follows. Each switch in a closed position delivers power to customers in the network. The open switch 15 divides the network into two sub-networks such that the power source 11 feeds all the switches 14a to 14e and power source 12 feeds all the switches 14h to 14f which are in a closed state. When a fault occurs in the network for example between switches 14b and 14c it is necessary to isolate the fault. This is achieved by opening the autorecloser switch 13 which disconnects power to all the customers in that sub-network. A fault isolation sequence isolates the fault however all the customers associated with the switches positioned in series after switch 14b to the open switch 15 are disconnected due to the isolation of the fault. It is now necessary to provide a control mechanism to reconnect as many disconnected customers as possible quickly to the second power source 12 which is the main object of the present invention. It will be appreciated that the switch controller 2 on a normally closed switch 14 will begin its intelligent switching sequence after the power supply has been disconnected from both sides of the power network for a defined period, for the purposes of the examples below, this period is assumed to be 100 mS. At this time, the switch controller 2 will automatically open the switch 14. When power supply is restored to one side of the switch 14, the switch 14 will automatically close after a defined period, for the purposes of the examples, this period is assumed to be 200 mS.

If the power supply is disconnected from the power sources 11 and 12 within a defined period of the switch 14 closing, then the switch 14 enters a pre-lockout state which will disable the automatic closing of the switch 14. The automatic switch closing functionality must be manually reset before the intelligent switching can resume. For the purposes of the following examples, assume that the allowed time between the switch closing and the supply being tripped by the protection device is 50 mS, the lockout time. The switch controller 2 on a normally open point 15 will begin its intelligent switching sequence after the supply has been disconnected from one side for a defined period, for the purposes of the following examples, this period is assumed to be 4 seconds. At this time, the intelligent controller 2 will automatically close the open switch 15.

Referring again to FIG. 2, power sources 11 and 12 use a combined protection relay and auto-recloser switch 13 and 16 respectively to break the supply under a fault condition and to try to restore power after a pre-defined time period. It has one open point 15 to ensure that both power sources are not connected together which divides the network into two subnetworks.

Figure 3:
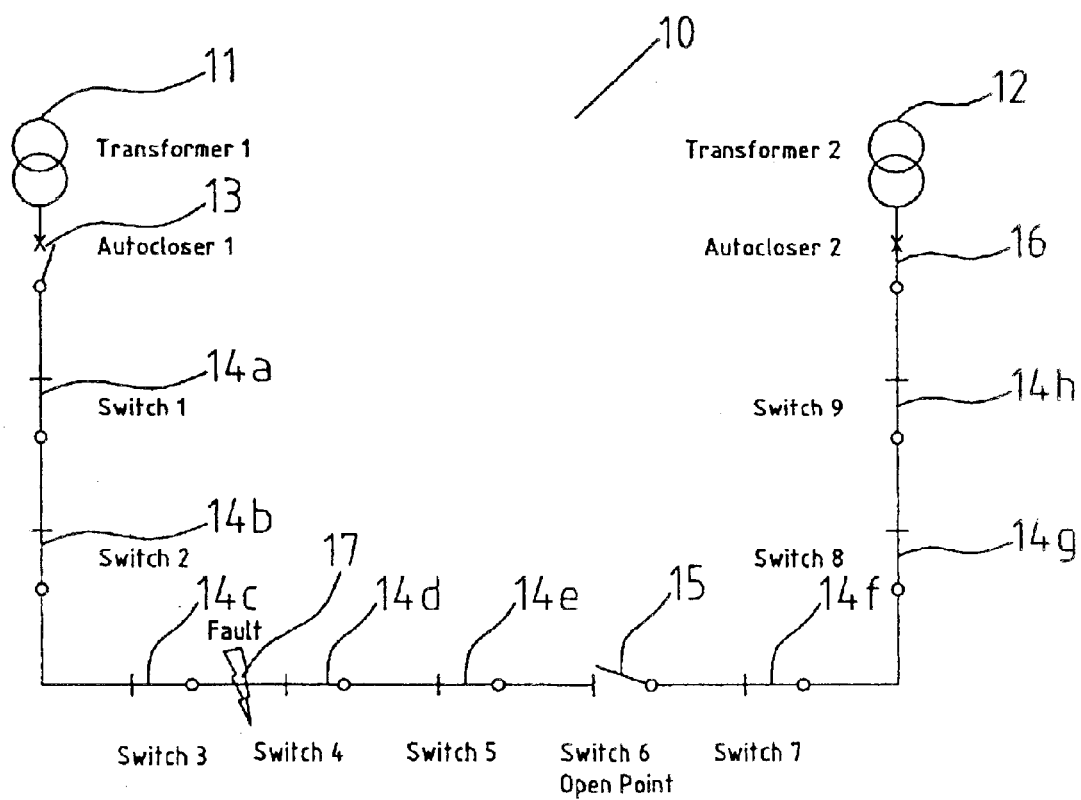

In the event of a fault between switch 14c and switch 14d, the auto-recloser 13 will open immediately to break the supply. The auto-recloser 13 actions described in these scenarios are part of the standard functionality of a recloser and not part of this invention. After the auto-recloser 13 has opened, it will immediately, approximately 50 ms, reclose and if the fault was transient, will stay closed. If the fault is permanent, then the auto-recloser 13 will immediately reopen, which is illustrated in FIG. 3.

Figure 4:
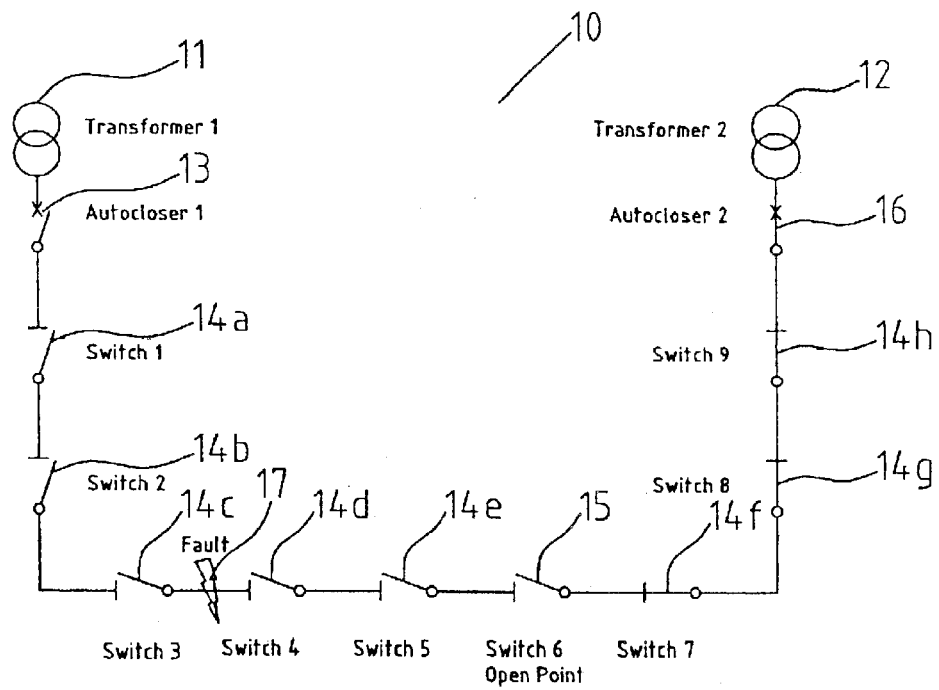

When power is removed from the sub-network being powered by the power source 11, for example, greater than 50 ms, all isolation switches 14a to 14h will open and begin their isolation sequence, as illustrated in FIG. 4.

Figure 5:
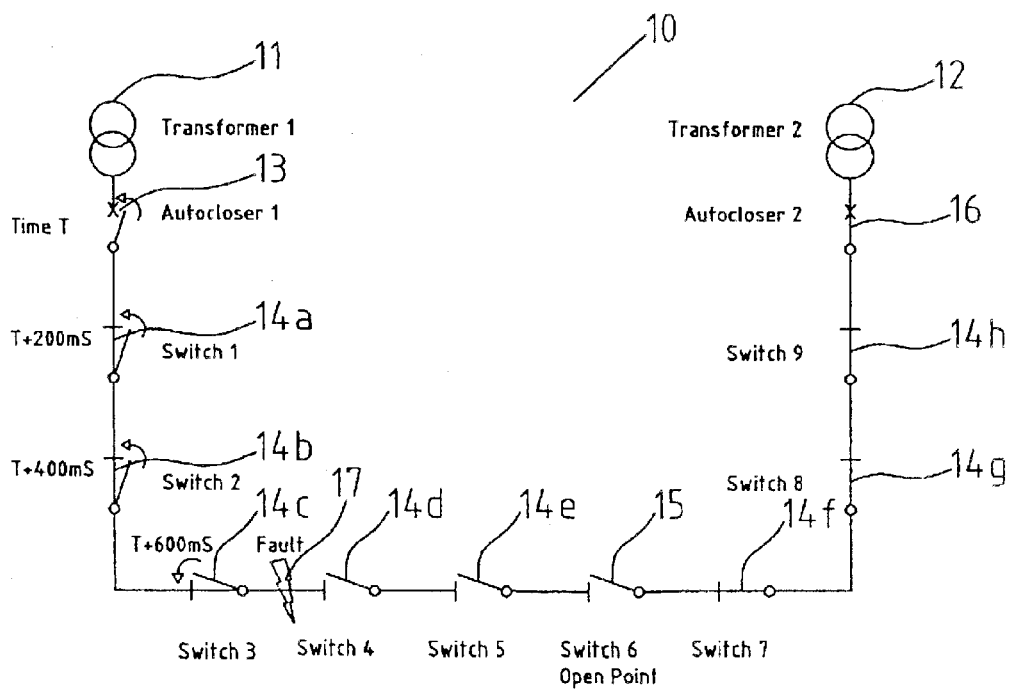

Auto-recloser 13 will again try to reclose. When the intelligent switch controllers, on each of the switches 14a to 14h, detect power on the feed, they will automatically close after a predefined period. Switch 14a will initially detect power on the feed side and it will close after 200 mS. Then, switch 14b will detect power on the feed side and it will close after another 200 mS. Then, switch 14b will detect power on the feed side and it will close after another 200 mS, as illustrated in FIG. 5.

Figure 6:
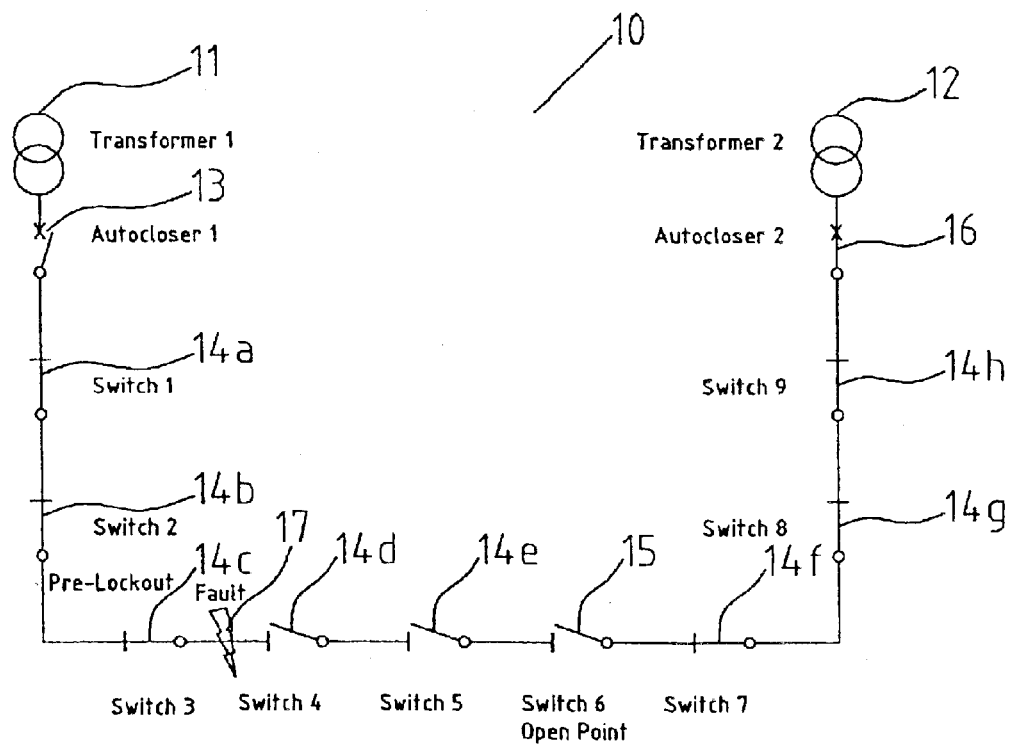
Figure 7:
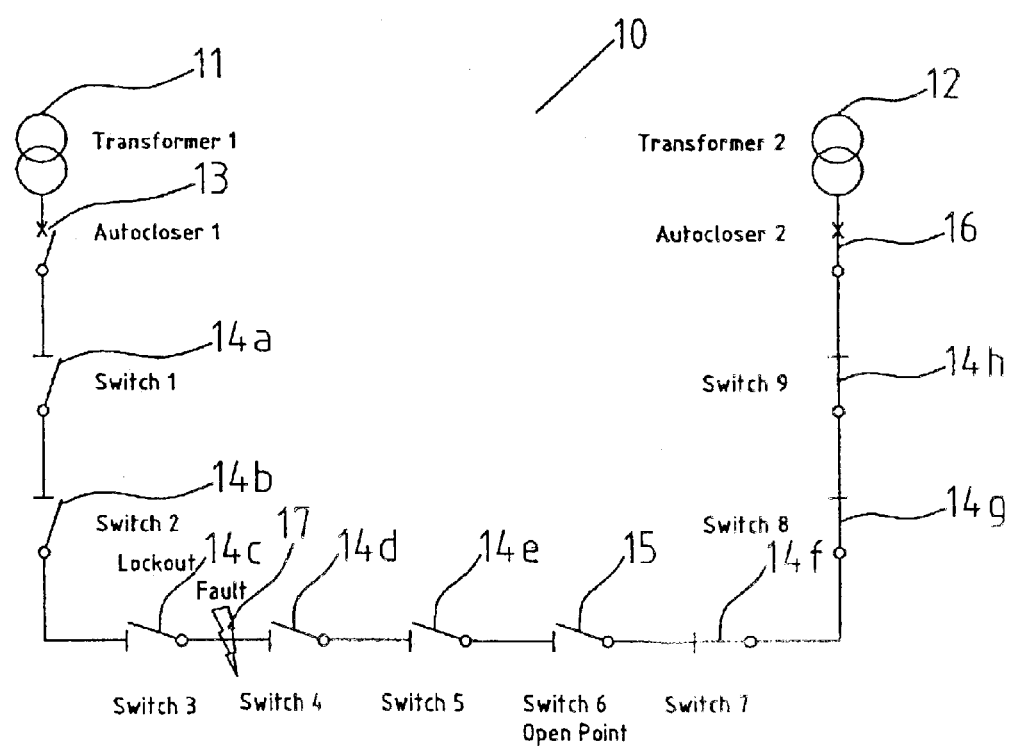

As soon as the switch 14c closes, the auto-recloser 13 will again detect the fault and will open immediately to break the supply. Switch 14c will detect that the supply has been cut within 50 mS of closing the switch 14f and is opened to enter a pre-lockout state, awaiting the next automatic opening, at which time it will lockout and no longer partake in any intelligent switching mechanism until it is manually reset by a repair crew, for example. This lockout is illustrated in FIG. 6.

Figure 8:
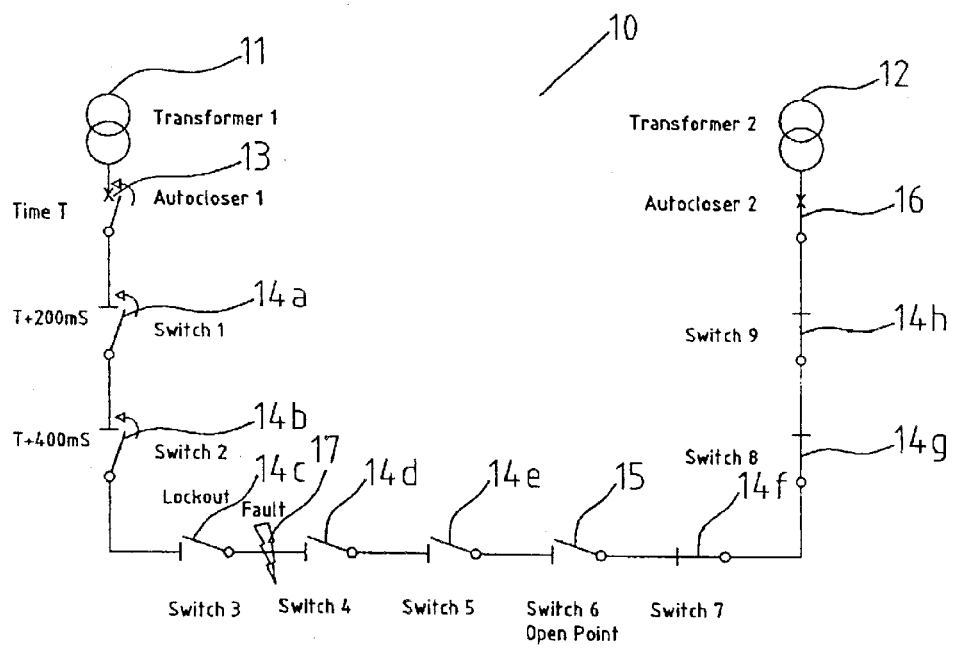

When auto-recloser 13 opens and power is removed from the line, for example, greater than 50 mS, all intelligent switches will open and begin their isolation sequence again, as illustrated in FIG. 8. At this time, switch 14c enters a lockout state and will not partake in the intelligent switching sequence.

Auto-recloser 13 will again try to reclose. The switches 14a to 14c will close after a predefined period when they detect power on one side of the switch. Switch 14a will initially detect power and it will close after 200 mS. Then switch 14b will detect power and it will close after another 200 mS. Switch 14c will detect power but it is in a lockout state and will not attempt to close the switch, as shown in FIG. 8. The fault has now been isolated.

Figure 9:
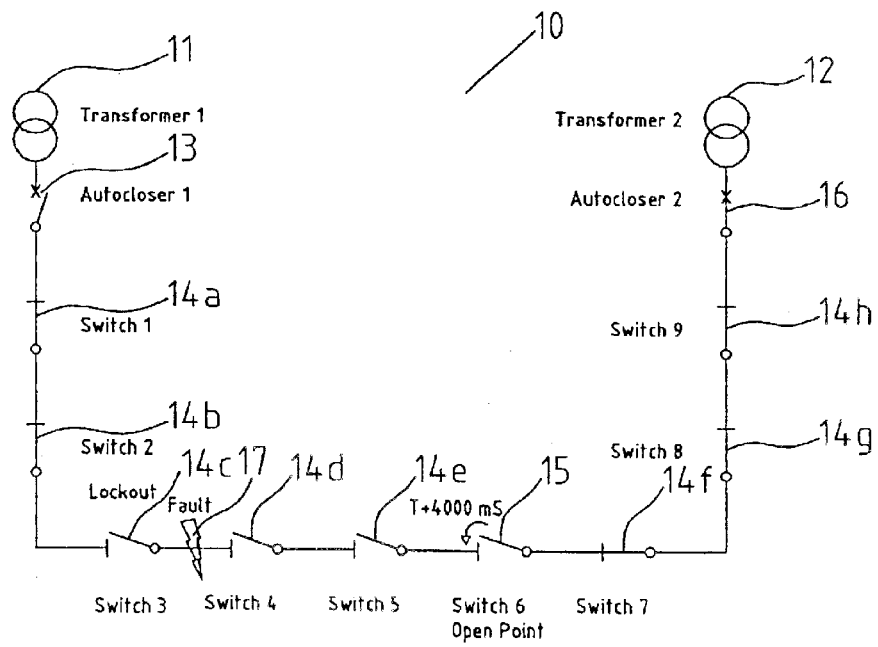

At this point, the maximum number of customers have had their power restored from the original source, power source 11. However, more customers could have power restored from the other power source 12. After the open switch 15 detects loss of power at one side of the open switch 15 for a pre-defined period for example 4 seconds, then it will automatically close and try to restore power to the other side, as shown in FIG. 9.

Figure 10:
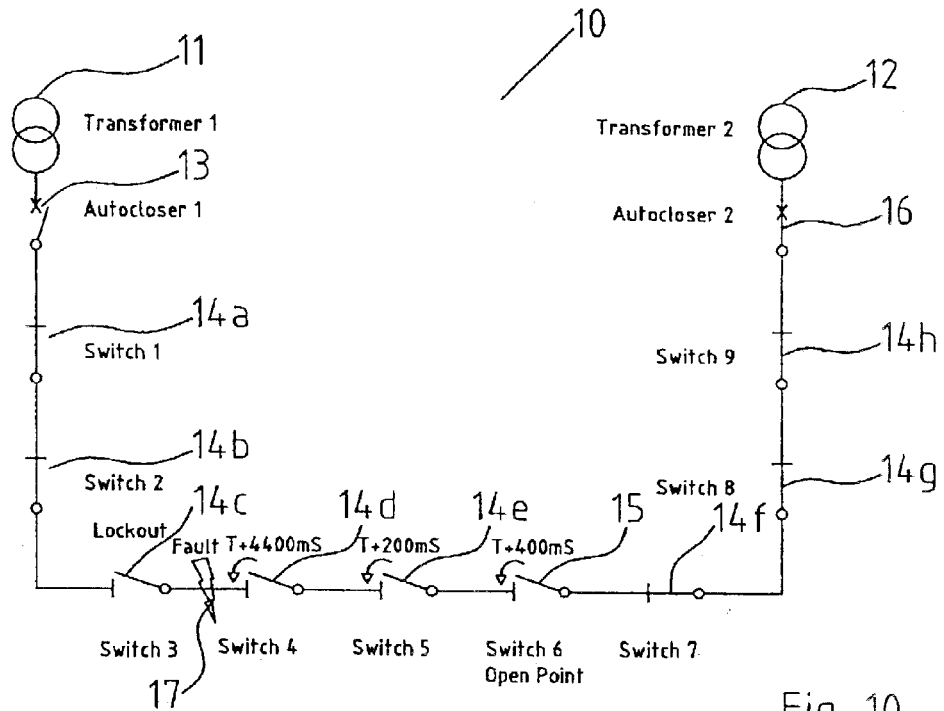

When the intelligent switch controllers 2, of switch 14e and switch 14d, detect power, they will automatically close after a predefined period. Switch 14e will initially detect power supplied via switch 15 and it will close after 200 mS. Then switch 14d will detect power supplied via switch 14e and it will close after another 200 ms, as illustrated in FIG. 10.

Figure 11:
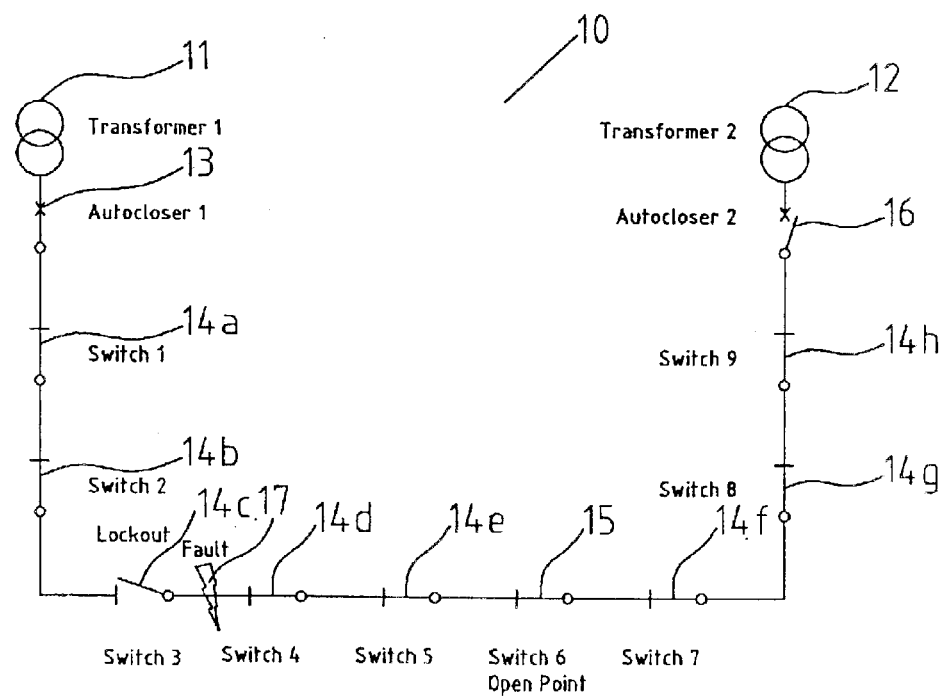

Switch 14d closes onto the fault so that auto-recloser 16 will detect the fault and trip open immediately to break the supply, as shown in FIG. 11. Switch 14d will detect that the supply has been cut within 50 mS of closing the switch so it recognises that it caused the trip. It will enter a pre-lockout state awaiting the next automatic opening at which time it will lockout and no longer partake in any intelligent switching mechanism until it is manually reset.

Figure 12:
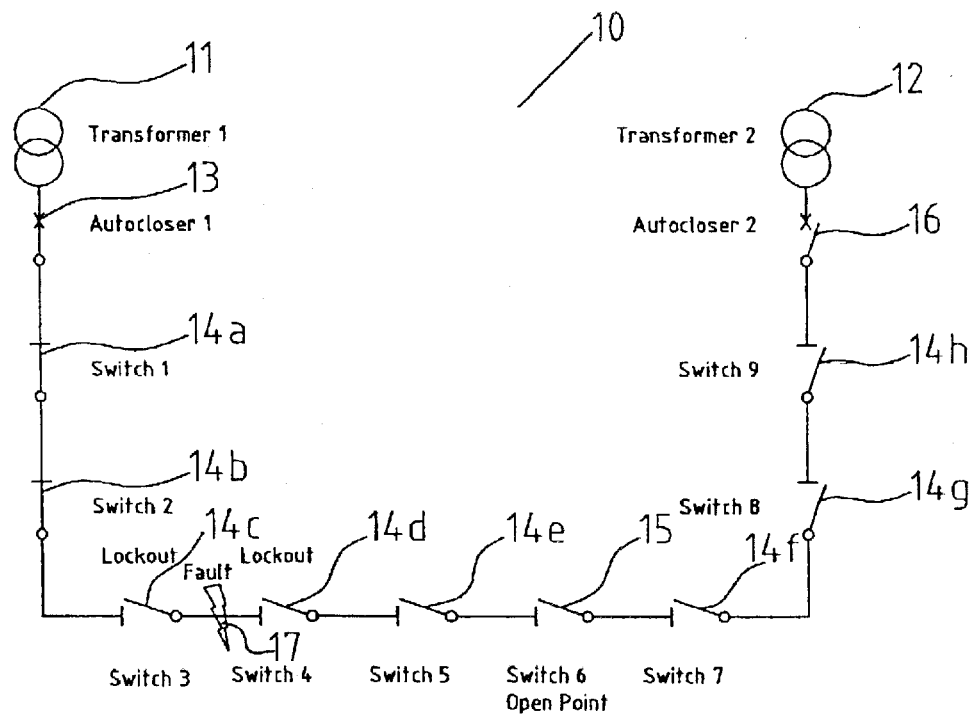

When auto-recloser 16 opens and power is removed from the line for, for example, greater than 50 mS, all intelligent controllers will open and begin their isolation sequence again, as illustrated in FIG. 12. At this time, switch 14d enters a lockout state and will not partake in the intelligent switching sequence.

Figure 14:
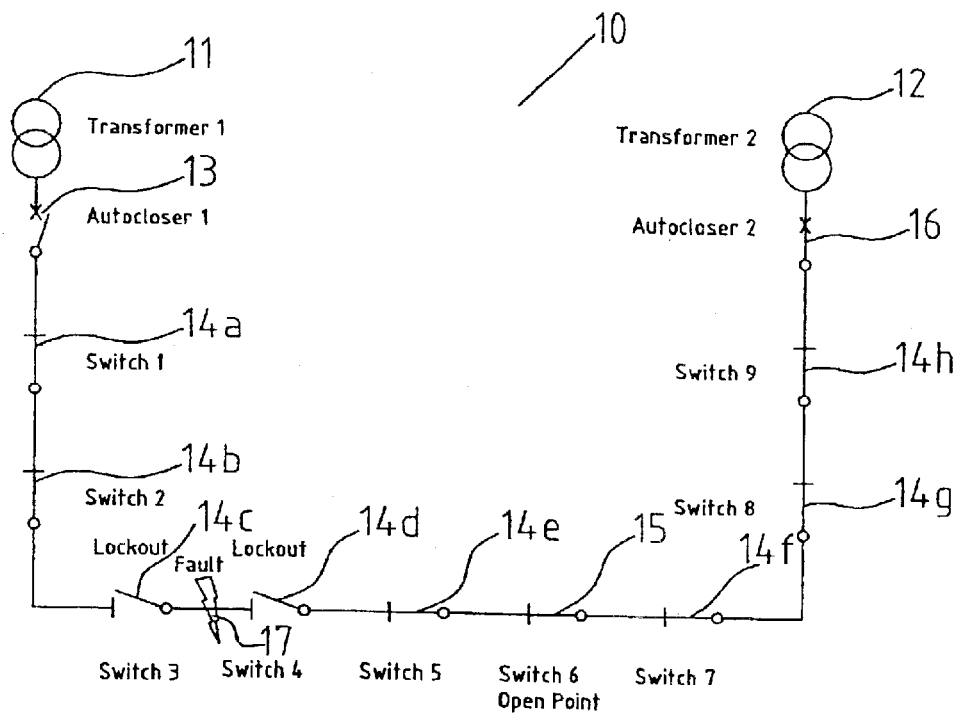

Auto-recloser 16 will again try to reclose. The intelligent switches will close after a predefined period when power is detected power on one side of the switch. Switch 14h will initially detect power and it will close after 200 mS. Then switches 14g through to switch 14e will detect power and close in sequence. Switch 14d will detect power but is in a lockout state and will not attempt to close the switch, as illustrated in FIG. 14. This restores power to the maximum number of customers from the second power supply 12 as shown in FIG. 14.

Figure 16:
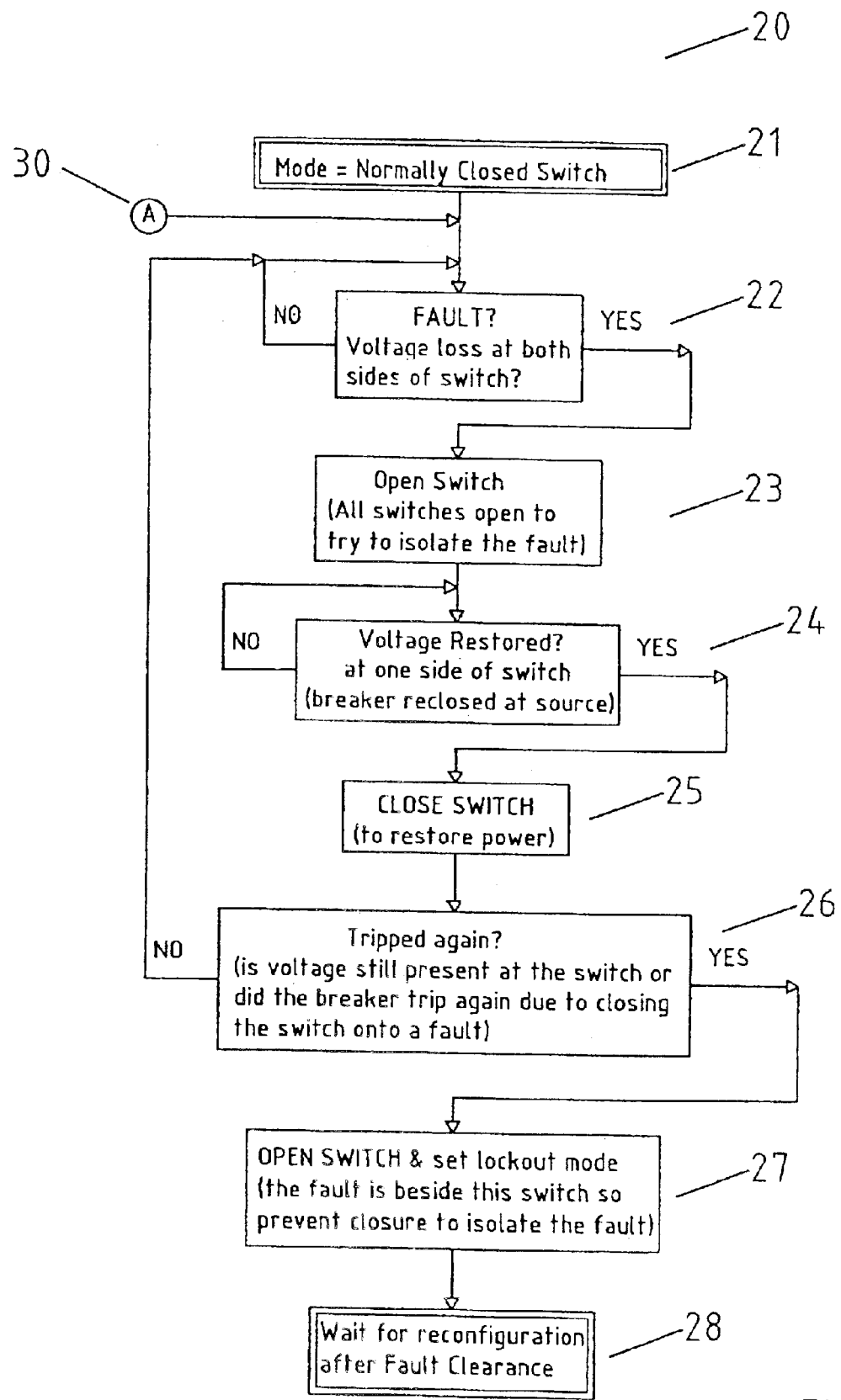
FIG. 16 is a flowchart of a fault restoration algorithm.
Figure 17:
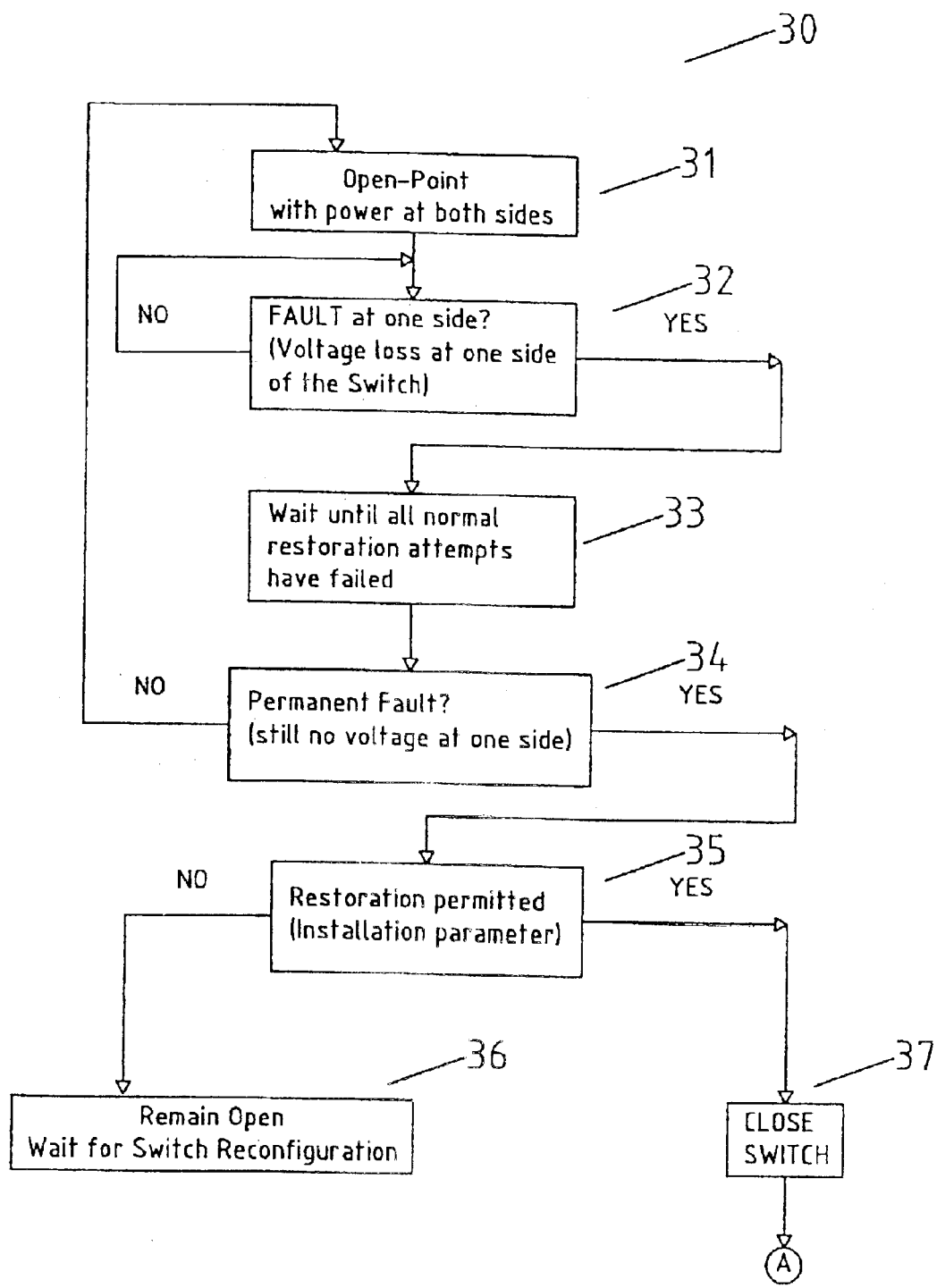
FIG. 17 is a flowchart to illustrate the sequence of moving an open switch.

Referring now to FIGS. 16 and 17 there is provided flow diagrams of the fault restoration sequence and the moving of the open switch 15 defining two subnetworks indicated by the reference numerals 20 and 30 respectively. In step 21 all the switches are closed allowing for normal operation for power distribution. Step 22, if no fault is detected then the power is distributed as normal. If a fault is detected in the network all the switches are opened for a power source where a fault causes a trip to try and isolate the fault in step 23. In step 24 the voltage is to be restored at one side of the open switch 14 if a voltage is detected. In step 25, the fault isolation sequence begins where voltage is restored at one side of each switch sequentially and the switch is closed. In step 26 when the switch is closed a decision is made by the microcontroller 5 based on whether voltage is still present at the switch. If the voltage is still present at the switch then it is assumed by the controller 2 that it did not close onto the fault but if no voltage is present it is assumed that the breaker tripped again due to closing the switch onto a fault. If a fault is still detected then the switch is re-opened and a lock out mode is set. This indicates that the fault is beside this switch so that the fault is isolated in step 27. If no fault is detected, then steps 25, 26 and 27 are repeated for the next switch in series until the fault is located. This restoration sequence is given by way of example in FIGS. 2 to 9. In step 28 the fault restoration sequence is complete once the fault has been isolated.

Figure 13:
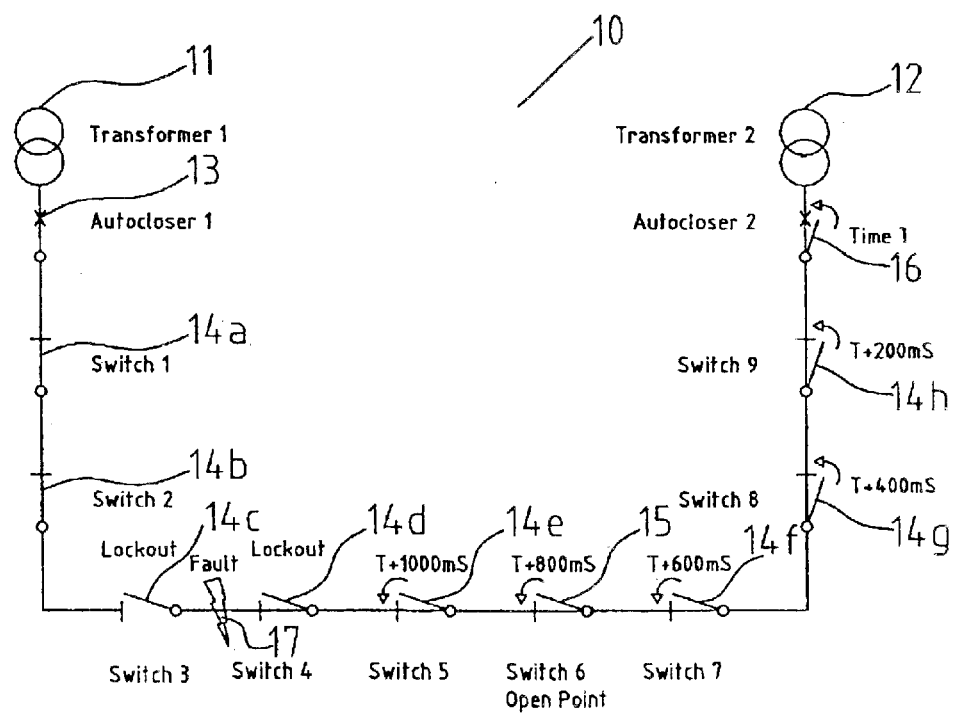

Referring now to FIG. 17 once the fault has been isolated for one of the power sources, it is now necessary to move the open switch 15 closer to the fault. In step 31 power is detected at both sides of the open switch 15 under normal non-fault conditions. The switch controller 2 continuously monitors for voltage loss at one side of the switch controller 2 in step 32. If a fault is detected the microcontroller 5 waits until the normal restoration and isolation of the fault sequence has been completed in step 33. In steps 34 and 35, if no voltage is still not detected at one side of the open point 15 after a preset time which is greater than the length of time for the restoration sequence for a power source, then the intelligent switch controller associated with the open switch 15 deduces a permanent fault at the side no voltage is detected. In order to isolate the fault further and reconnect as many customers as possible, the open switch 15 is closed as well as the isolation switches 14e and 14d in series until switch 14d closes on the fault so that the auto-recloser switch 16 trips to open all the isolation switches, as illustrated in FIGS. 12 and 13. When the open switch 15 is closed it acts as a fault isolation switch. Power is then restored from power source 12 to as many switches until switch 14d trips on the fault 17 to enter a lockout state and become the new open switch defining a new subnetwork. It will be appreciated that the above can be carried out by software instructions stored in each intelligent switch controller. If no restoration is permitted then the switch will remain open and wait for the switch configuration to be initiated by the microcontroller 5 as illustrated in step 36. If restoration is permitted then the open switch is closed and the restoration sequence is completed. It will be appreciated that the above steps are carried out automatically without the need for communication controllers or manual intervention. This will result in switches closer to the fault for example 14d and 14e to go through their restoration sequence as illustrated in FIG. 14.

Figure 15:
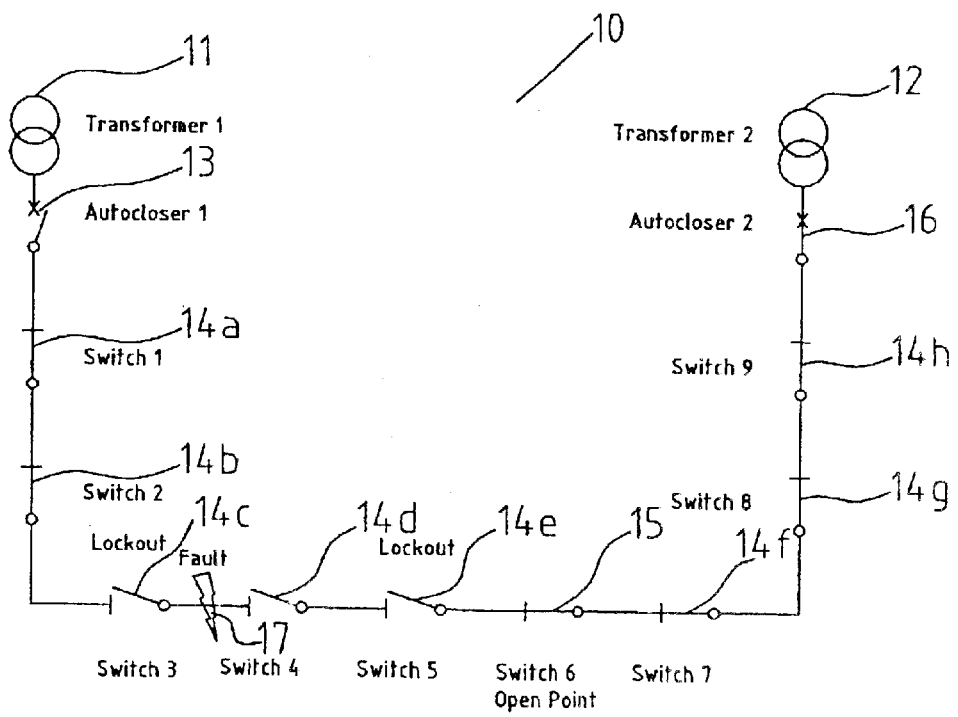
FIG. 15 illustrates another switching sequence in a power network.

Referring now to FIG. 15 it will be appreciated that the invention is self regulating in the sense that when the open switch 15 is moved power is restored to the maximum number of customers without overloading the power source 12. If the power source 12 cannot provide enough power to restore all of the disconnected customers then it will self regulate to match the load to the supply capacity. As each switch closes to restore power to more of the disconnected power network the load on the power source 12 increases. If this load exceeds the capacity of the power source 12 it will cause a trip similar to that produced by switching onto a fault. The last switch that closed will recognise that it caused the overload or trip and will enter a lock-out state. This regulates the load according to the capacity of the power source 12 and restores power to as much of the power network as possible. This is illustrated in FIG. 15 where switch 14e has caused an overload to the power source 12 and has entered the lock-out state.

It will be appreciated that when the invention tries to restore power from the alternative supply the sequence will initially switch onto the fault before the switch closest to the fault, switch 14d, goes to a lockout state. This causes a temporary power toss to all customers on the alternative supply line. A way to avoid this is to use communications between the switch controllers 2 and particularly between neighbouring switch controllers. When a fault occurs and the controllers first go through their isolation sequence, switch 14c enters the lockout state. At this time it can instruct neighbouring switches at either side 14b and 14d to enter lockout state if they have not had power within the previous 400 ms. Switch 14b will have had power within 400 ms and will not lockout. Switch 14d will not have had power within the previous 400 ms and will enter lockout state. This means that it will not close onto the fault when trying to restore power for the alternative supply.

The invention provides a simple mechanism to determine where the fault is located in the network. The switch controller 2 closest to power sources can determine the location of the fault by measuring the switching times of each isolation switch. If it monitors the time form when it closes to when the power is lost again it is proportional to the fault location. For example if switch 14a is monitoring the timing and it closes onto the fault. The power is lost immediately so the fault is located between switch 14a and switch 14b. If switch 1 closes and 200 ms later the next switch, switch 14b, closes onto the fault and power will be lost immediately. If switch 14a knows that it lost power 200 ms after closing then it will know that the fault is between switch 14b and switch 14c. To determine at which switch the fault is located switch 14a can simply measure the time between closing and the loss of power and divide this time by the closing switching time delay for example 200 ms.

In the examples both switch 14a and switch 14b can determine where the fault is located. If one or both of these units is equipped with a communications device it can notify the appropriate personnel where the fault is located. This is a low cost means of immediately determining and notifying the location of a fault without installing communications equipment at every switch.

It will be appreciated that by including current sensing and local communications at each switch more informed switching decisions can be made. The inclusion of a current sensor allows the unit to determine the current flowing through the switch under no-fault conditions. If each switch exchanges this information with their neighbouring or adjacent switch they can determine the current required for each feeder segment which is the power consumption between two switches. When trying to restore power from an alternative supply each controller can then determine whether closing the switch will exceed the capacity of the second supply. This would be accompanied by additional settings stored in the controller for threshold capacity for each of the possible supplies.

It will be appreciated that while this specification describes a dual feed system the invention can be equally applied to multi-feed systems where different timings configured for the open switches are used for different power sources.

Another advantage of the present invention is that it only opens switches under no load conditions are used so the rating on the switches can be lower than would be required if they were opening under load conditions. This is an important consideration as it simplifies the construction of the control system while also reducing on expense.

It will be appreciated that various aspects of the invention may be embodied on a computer that is running a program or program segments originating form a computer readable or usable medium, such medium including but not limited to magnetic storage media (e.g. ROMs, floppy disks, hard disks, etc.), optically readable media (e.g. CD-ROMs, DVDs, etc.) and carrier waves (e.g. transmissions over the internet). A functional program, code and code segments, used to implement the present invention can be derived by a skilled computer programmer form the description of the invention contained herein. It will be appreciated therefor that a computerised program may be provided providing program instructions which, when loaded into a computer program may be embodied on a record medium, a computer memory, a read only memory or carried on an electrical carrier signal.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the claims.

What is claimed is:

1. A control system for automatically reconnecting power to customers in a distribution automation multi-feed power network on a fault disconnecting customers in the network, comprising:

at least two separate power sources, each power source comprising s power feed to the network, an autorecloser switch, and means for connecting each power source for delivering power to at least some of the customers in the power network;

means to allow the power network to be divided into sub-networks each of which connectable to a power source;

a plurality of fault isolation switches for disconnecting customers positioned in series in said sub-network, each isolation switch comprising either an open or closed state and connected to a separate intelligent switch controller;

actuating means in each intelligent switch controller to actuate each isolation switch to either an open or closed state;

fault detection means to determine if a fault exists in said power network and in the event a fault is detected in a sub-network, the auto-recloser switch trips each isolation switch to an open state to disconnect each customer in said sub-network;

timing logic means within each intelligent switch controller for sequentially restoring power to each isolation switch on said intelligent switch controller determining a no fault condition at each isolation switch;

identifying means within each intelligent switch controller to determine a fault condition at each isolation switch from said fault detection means and said timing logic means and, on identifying a fault at said isolation switch, means to isolate said fault by configuring said isolation switch open to a lockout state to disconnect customers associated with said isolation switch and means to keep each isolation switch open positioned in series thereafter from said power source in said sub-network; and means within each intelligent switch controller, on identifying and isolating said fault, to implement a local control means to automatically after a predetermined delay period, connect said open isolation switches positioned in series sequentially to said other sub-network and close each open isolation switch to deliver power to disconnected customers from said other power source whereby a minimum number of customers are disconnected from said power sources in said power network.

2. The control system for automatically reconnecting power to customers in a distribution automation multi-feed power network of claim 1, in which said timing logic means is connected to a microcontroller to provide timing logic so that a restoration sequence is initiated after said auto-recloser switch has determined that a permanent fault exists in the network.

3. The control system for automatically reconnecting power to customers in a distribution automation multi-feed power network of claim 1, in which the predetermined period time is greater than the time taken for the initiated restoration sequence.

4. The control system for automatically reconnecting power to customers in a distribution automation multi-feed power network of claim 1, in which said timing logic means is connected to a microcontroller to provide timing logic so that a restoration sequence is initiated after said auto-recloser switch has determined that a permanent fault exists in the network and in which the predetermined period time is greater than the time taken for the initiated restoration sequence.

5. The control system for automatically reconnecting power to customers in a distribution automation multi-feed power network of claim 1, in which during said local control means, configuring said isolation switch to a lockout state, the capacity of electrical power deliverable of said second power source is not exceeded when closing said isolation switches in series towards said fault.

6. The control system for automatically reconnecting power to customers in a distribution automation multi-feed power network of claim 1, wherein on configuring said isolation switch to a lockout state there is provided means to determine the power delivered to the number of isolation switches closed and connected to the other sub-network.

7. The control system for automatically reconnecting power to customers in a distribution automation multi-feed power network of claim 1, in which each switch in the network operates under a no load condition, provided that said auto-recloser switch acts as a load breaking switch and is positioned adjacent said power source.

8. The control system for automatically reconnecting power to customers in a distribution automation multi-feed power network of claim 1, in which said intelligent switch controller comprises voltage sensing means for measuring voltage at each side of said isolation switches to determine the state of the network at each switch.

9. The control system for automatically reconnecting power to customers in a distribution automation multi-feed power network of claim 8, in which said intelligent switch controller comprises a microcontroller which stores control software instructions and receives information from said voltage sensing means to control the opening and closing of each associated switch.

10. The control system for automatically reconnecting power to customers in a distribution automation multi-feed power network of claim 1 in which communication means is provided between adjacent intelligent switch controllers.

11. The control system for automatically reconnecting power to customers in a distribution automation multi-feed power network of claim 1 in which communication means is provided between adjacent intelligent switch controllers when a fault is isolated at an isolation switch, said isolation switch enters a lockout state, the communication means transmits a signal to said adjacent switch controllers for each associated switch to enter a lockout state if no power is detected at each adjacent switch for a preset period.

12. The control system for automatically reconnecting power to customers in a distribution automation multi-feed power network of claim 1 in which monitoring means determines the location of the fault in the power network.

13. The control system for automatically reconnecting power to customers in a distribution automation multi-feed power network of claim 1 in which said intelligent switch controller positioned adjacent to said power source monitors switching restoration times of said fault isolation switches for isolating a fault.

14. The control system for automatically reconnecting power to customers in a distribution automation multi-feed power network of claim 1 in which during the fault isolation there is provided monitoring means which measures the time from when an isolation switch is closed to when power is lost at said isolation switch determines the switch location of the fault.

15. The control system for automatically reconnecting power to customers in a distribution automation multi-feed power network of claim 1 in which only one switch of each sub-network is provided with a communications device to determine and communicate the location of a fault in the power network.

16. The control system for automatically reconnecting power to customers in a distribution automation multi-feed power network of claim 1 in which monitoring means determines the location of the fault in the power network and in which said intelligent switch controller positioned adjacent to said power source monitors switching restoration times of said fault isolation switches for isolating a fault.

17. The control system for automatically reconnecting power to customers in a distribution automation multi-feed power network of claim 1 in which monitoring means determines the location of the fault in the power network and in which during the fault isolation the monitoring means measures the time from when an isolation switch is closed to when power is lost at said isolation switch.

18. The control system for automatically reconnecting power to customers in a distribution automation multi-feed power network of claim 1 in which monitoring means determines the location of the fault in the power network and in which only one switch of each sub-network is provided with a communications device to determine and communicate the location of a fault in the power network.

19. The control system for automatically reconnecting power to customers in a distribution automation multi-feed power network of claim 1 in which said intelligent switch controller positioned adjacent to said power source monitors switching restoration times of said fault isolation switches for isolating a fault and in which during the fault isolation, monitoring means measures the time from when an isolation switch is closed to when power is lost at said isolation switch.

20. The control system for automatically reconnecting power-to customers in a distribution automation multi-feed power network of claim 1 in which said intelligent switch controller positioned adjacent to said power source monitors switching restoration times of said fault isolation switches for isolating a fault and in which only one switch of each sub-network is provided with a communications device to determine and communicate the location of a fault in the power network.

21. The control system for automatically reconnecting power to customers in a distribution automation multi-feed power network of claim 1 in which during the fault isolation monitoring means measures the time from when an isolation switch is closed to when power is lost at said isolation switch and in which only one switch of each sub-network is provided with a communications device to determine and communicate the location of a fault in the power network.

22. The control system for automatically reconnecting power to customers in a distribution automation multi-feed power network of claim 1 in which monitoring means determines the location of the fault in the power network and in which said intelligent switch controller positioned adjacent to said power source monitors switching restoration times of said fault isolation switches for isolating a fault and in which during the fault isolation, the monitoring means measures the time from an isolation switch is closed power is lost at said isolation switch.

23. The control system for automatically reconnecting power to customers in a distribution automation multi-feed power network of claim 1 in which monitoring means determines the location of the fault in the power network and in which said intelligent switch controller positioned adjacent to said power source monitors switching restoration times of said fault isolation switches for isolating a fault and in which only one switch of each sub-network is provided with a communications device to determine and communicate the location of a fault in the power network.

24. The control system for automatically reconnecting power to customers in a distribution automation multi-feed power network of claim 1 in which said intelligent switch controller positioned adjacent to said power source monitors switching restoration times of said fault isolation switches for isolating a fault and in which during the fault isolation monitoring means measures the time from when an isolation switch is closed to when power is lost at said isolation switch and in which only one switch of each sub-network is provided with a communications device to determine and communicate the location of a fault in the power network.

25. The control system for automatically reconnecting power to customers in a distribution automation multi-feed power network of claim 1 in which monitoring means determines the location of the fault in the power network and in which during the fault isolation the monitoring means measures the time from when an isolation switch is closed to when power is lost at said isolation switch is and in which only one switch of each sub-network is provided with a communications device to determine and communicate the location of a fault in the power network.

26. The control system for automatically reconnecting power to customers in a distribution automation multi-feed power network of claim 1 in which monitoring means determines the location of the fault in the power network and in which said intelligent switch controller positioned adjacent to said power source monitors switching restoration times of said fault isolation switches for isolating a fault and in which during the fault isolation, the monitoring means measures the time from when an isolation switch is closed to when power is lost at said isolation switch and in which only one switch of each sub-network is provided with a communications device to determine and communicate the location of a fault in the power network.

27. The control system for automatically reconnecting power to customers in a distribution automation multi-feed power network of claim 1 in which each intelligent switch controller comprises a current sensor to determine the current required between each isolation switch.

28. The control system for automatically reconnecting power to customers in a distribution automation multi-feed power network of claim 1, in which each isolation switch is self regulating to provide power control in the network.

29. The control system for automatically reconnecting power to customers in a distribution automation multi-feed power network of claim 1 in which during said local control means on moving said open switch the capacity of said second power source is not exceeded in the network.

30. The control system for automatically reconnecting power to customers in a distribution automation multi-feed power network of claim 1 in which a threshold capacity is stored in said intelligent switch controller of each power source for delivering power in each sub-network.

31. The control system for automatically reconnecting power to customers in a distribution automation multi-feed power network of claim 1, in which each intelligent switch controller comprises a current sensor to determine the current required between each isolation switch and in which each isolation switch is self regulating to provide power control in the network and in which during said local control means on moving said open switch the capacity of said second power source is not exceeded in the network and in which a threshold capacity is stored in said intelligent switch controller of each power source for delivering power in each sub-network.

32. A control system for automatically reconnecting power to customers in a distribution automation multi-feed power network on a fault disconnecting customers in the network, comprising:

at least two separate power sources, each power source comprising a power feed to the network, an autorecloser switch, and means for connecting each power source for delivering power to at least some of the customers in the power network;

a plurality of fault isolation switches for disconnecting customers positioned in series in said power network, each isolation switch comprising either an open or closed state and connected to a separate intelligent switch controller;

means to allow the power network to be divided into sub-networks each of which connectable to a power source by providing a fault isolation switch in an open state;

actuating means in each intelligent switch controller to actuate each isolation switch to either an open or closed state;

fault detection means to determine if a fault exists in said power network and in the event a fault is detected in a sub-network, the auto-recloser switch trips each isolation switch to an open state to disconnect each customer in said sub-network;

timing logic means within each intelligent switch controller for sequentially restoring power to each isolation switch on said intelligent switch controller determining a no fault condition at each isolation switch;

identifying means within each intelligent switch controller to determine a fault condition at each isolation switch from said fault detection means and said timing logic means and, on identifying a fault at said isolation switch, means to isolate said fault by configuring said isolation switch open to a lockout state to disconnect customers associated with said isolation switch and means to keep each isolation switch open positioned in series thereafter from said power source in said sub-network;

means within each intelligent switch controller, on identifying and isolating said fault, to implement a local control means to automatically after a predetermined period move said open fault isolation switch;

the intelligent switch controller for said open fault isolation switch comprises means, to detect no voltage at one side of said open fault isolation switch for said predetermined period, closes the open fault isolation switch;

said local control means has means to sequentially close each isolation switch kept open positioned in series from said open fault isolation switch until said fault is detected and said auto-recloser of the second power source trips each isolation switch in said other sub-network to an open state;

timing logic means within each intelligent switch controller for sequentially restoring power to each open isolation switch and on said intelligent switch controller determining a no fault condition at each isolation switch from said other power source; and identifying means within each intelligent switch controller to determine said fault condition at an isolation switch and on identifying said fault, said local control means configures the isolation switch to an open lockout state to define a sub-network whereby a minimum number of customers are disconnected from said power sources in said power network.

33. The control system for automatically reconnecting power to customers in a distribution automation multi-feed power network of claim 32, in which said timing logic means is connected to a microcontroller to provide tinting logic so that a restoration sequence is initiated after said auto-recloser switch has determined that a permanent fault exists in the network.

34. The control system for automatically reconnecting power to customers in a distribution automation multi-feed power network of claim 32, in which the predetermined period time is greater than the time taken for the initiated restoration sequence.

35. The control system for automatically reconnecting power to customers in a distribution automation multi-feed power network of claim 32, in which said timing logic means is connected to a microcontroller to provide timing logic so that a restoration sequence is initiated after said auto-recloser switch has determined that a permanent fault exists in the network and in which the predetermined period time is greater than the time taken for the initiated restoration sequence.

36. The control system for automatically reconnecting power to customers in a distribution automation multi-feed power network of claim 32, in which during said local control means, configuring said isolation switch to a lockout state, the capacity of electrical power deliverable of said second power source is not exceeded when closing said isolation switches in series towards said fault.

37. The control system for automatically reconnecting power to customers in a distribution automation multi-feed power network of claim 32, wherein on configuring said isolation switch to a lockout state there is provided means to determine the power delivered to the number of isolation switches closed and connected to the other sub-network.

38. The control system for automatically reconnecting power to customers in a distribution automation multi-feed power network of claim 32, in which each switch in the network operates under a no load condition, provided that said auto-recloser switch acts as a load breaking switch and is positioned adjacent said power source.

39. The control system for automatically reconnecting power to customers in a distribution automation multi-feed power network of claim 32, in which said intelligent switch controller comprises voltage sensing means for measuring voltage at each side of said isolation switches to determine the state of the network at each switch.

40. The control system for automatically reconnecting power to customers in a distribution automation multi-feed power network of claim 32, in which said intelligent switch controller comprises a microcontroller which stores control software instructions and receives information from said voltage sensing means to control the opening and closing of each associated switch.

41. The control system for automatically reconnecting power to customers in a distribution automation multi-feed power network of claim 32 in which communication means is provided between adjacent intelligent switch controllers.

42. The control system for automatically reconnecting power to customers in a distribution automation multi-feed power network of claim 32 in which communication means is provided between adjacent intelligent switch controllers when a fault is isolated at an isolation switch, said isolation switch enters a lockout state, the communication means transmits a signal to said adjacent switch controllers for each associated switch to enter a lockout state if no power is detected at each adjacent switch for a preset period.

43. The control system for automatically reconnecting power to customers in a distribution automation multi-feed power network of claim 32 in which monitoring means determines the location of the fault in the power network.

44. The control system for automatically reconnecting power to customers in a distribution automation multi-feed power network of claim 32 in which said intelligent switch controller positioned adjacent to said power source monitors switching restoration times of said fault isolation switches for isolating a fault.

45. The control system for automatically reconnecting power to customers in a distribution automation multi-feed power network of claim 32 in which during the fault isolation there is provided monitoring means which measures the time from when an isolation switch is closed to when power is lost at said isolation switch determines the switch location of the fault.

46. The control system for automatically reconnecting power to customers in a distribution automation multi-feed power network of claim 32 in which only one switch of each sub-network is provided with a communications device to determine and communicate the location of a fault in the power network.

47. The control system for automatically reconnecting power to customers in a distribution automation multi-feed power network of claim 32 in which monitoring means determines the location of the fault in the power network and in which said intelligent switch controller positioned adjacent to said power source monitors switching restoration times of said fault isolation switches for isolating a fault.

48. The control system for automatically reconnecting power to customers in a distribution automation multi-feed power network of claim 32 in which monitoring means determines the location of the fault in the power network and in which during the fault isolation the monitoring means measures the time from when an isolation switch is closed to when power is lost at said isolation switch.

49. The control system for automatically reconnecting power to customers in a distribution automation multi-feed power network of claim 32 in which monitoring means determines the location of the fault in the power network and in which only one switch of each sub-network is provided with a communications device to determine and communicate the location of a fault in the power network.

50. The control system for automatically reconnecting power to customers in a distribution automation multi-feed power network of claim 32 in which said intelligent switch controller positioned adjacent to said power source monitors switching restoration times of said fault isolation switches for isolating a fault and in which during the fault isolation, monitoring means measures the time from when an isolation switch is closed to when power is lost at said isolation switch.

51. The control system for automatically reconnecting power to customers in a distribution automation multi-feed power network of claim 32 in which said intelligent switch controller positioned adjacent to said power source monitors switching restoration times of said fault isolation switches for isolating a fault and in which only one switch of each sub-network is provided with a communications device to determine and communicate the location of a fault in the power network.

52. The control system for automatically reconnecting power to customers in a distribution automation multi-feed power network of claim 32 in which during the fault isolation monitoring means measures the time from when an isolation switch is closed to when power is lost at said isolation switch and in which only one switch of each sub-network is provided with a communications device to determine and communicate the location of a fault in the power network.

53. The control system for automatically reconnecting power to customers in a distribution automation multi-feed power network of claim 32 in which monitoring means determines the location of the fault in the power network and in which said intelligent switch controller positioned adjacent to said power source monitors switching restoration times of said fault isolation switches for isolating a fault and in which during the fault isolation, the monitoring means measures the time from when an isolation switch is closed to when power is lost at said isolation switch.

54. The control system for automatically reconnecting power to customers in a distribution automation multi-feed power network of claim 32 in which monitoring means determines the location of the fault in the power network and in which said intelligent switch controller positioned adjacent to said power source monitors switching restoration times of said fault isolation switches for isolating a fault and in which only one switch of each sub-network is provided with a communications device to determine and communicate the location of a fault in the power network.

55. The control system for automatically reconnecting power to customers in a distribution automation multi-feed power network of claim 32 in which said intelligent switch controller positioned adjacent to said power source monitors switching restoration times of said fault isolation switches for isolating a fault and in which during the fault isolation monitoring means measures the time from when an isolation switch is closed to when power is lost at said isolation switch and in which only one switch of each sub-network is provided with a communications device to determine and communicate the location of a fault in the power network.

56. The control system for automatically reconnecting power to customers in a distribution automation multi-feed power network of claim 32 in which monitoring means determines the location of the fault in the power network and in which during the fault isolation the monitoring means measures the time from when an isolation switch is closed to when power is lost at said isolation switch is proportional to the switch location of the fault and in which only one switch of each sub-network is provided with a communications device to determine and communicate the location of a fault in the power network.

57. The control system for automatically reconnecting power to customers in a distribution automation multi-feed power network of claim 32 in which monitoring means determines the location of the fault in the power network and in which said intelligent switch controller positioned adjacent to said power source monitors switching restoration times of said fault isolation switches for isolating a fault and in which during the fault isolation, the monitoring means measures the time from when an isolation switch is closed to when power is lost at said isolation switch and in which only one switch of each sub-network is provided with a communications device to determine and communicate the location of a fault in the power network.

58. The control system for automatically reconnecting power to customers in a distribution automation multi-feed power network of claim 32 in which each intelligent switch controller comprises a current sensor to determine the current required between each isolation switch.

59. The control system for automatically reconnecting power to customers in a distribution automation multi-feed power network of claim 32, in which each isolation switch is self regulating to provide power control in the network.

60. The control system for automatically reconnecting power to customers in a distribution automation multi-feed power network of claim 32 in which during said local control means on moving said open switch the capacity of said second power source is not exceeded in the network.

61. The control system for automatically reconnecting power to customers in a distribution automation multi-feed power network of claim 32 in which a threshold capacity is stored in said intelligent switch controller of each power source for delivering power in each sub-network.

62. The control system for automatically reconnecting power to customers in a distribution automation multi-feed power network of claim 32, in which each intelligent switch controller comprises a current sensor to determine the current required between each isolation switch and in which each isolation switch is self regulating to provide power control in the network and in which during said local control means on moving said open switch the capacity of said second power source is not exceeded in the network and in which a threshold capacity is stored in said intelligent switch controller of each power source for delivering power in each sub-network.

* * * * *